United States Patent [19]

Ambjerg Pedersen

[11] Patent Number: 5,626,901
[45] Date of Patent: May 6, 1997

[54] NO AND LOW FAT SALAD DRESSING COMPOSITIONS

[75] Inventor: Hans C. Ambjerg Pedersen, Hockessin, Del.

[73] Assignee: Hercules Incorporated, Wilmington, Del.

[21] Appl. No.: 512,875

[22] Filed: Aug. 9, 1995

[51] Int. Cl.$^6$ ................................................ A23L 1/24
[52] U.S. Cl. .................... 426/589; 426/573; 426/577; 426/602
[58] Field of Search ................................. 426/573, 577, 426/589, 602, 613

[56] References Cited

U.S. PATENT DOCUMENTS

| | | | |
|---|---|---|---|
| 3,367,784 | 2/1968 | Waitman et al. | 99/132 |
| 4,129,663 | 12/1978 | Jamison et al. | 426/626 |
| 5,082,684 | 1/1992 | Fung | 426/602 |
| 5,137,742 | 8/1992 | Bakai | 426/589 |
| 5,260,083 | 11/1993 | Brain et al. | 426/573 |
| 5,324,531 | 6/1994 | Hoefler et al. | 426/573 |
| 5,451,420 | 9/1995 | Brain et al. | 426/523 |

FOREIGN PATENT DOCUMENTS

| | | | |
|---|---|---|---|
| 2836140 | 2/1990 | Germany . | |
| 4013765 | 10/1991 | Germany . | |
| 4042405 | 4/1993 | Germany . | |
| 87741 | 5/1985 | Japan . | |
| 118162 | 6/1985 | Japan | A23L 1/24 |
| 149359 | 8/1985 | Japan | A23L 1/24 |
| 2156649 | 10/1985 | United Kingdom | A23L 1/04 |

OTHER PUBLICATIONS

Technical Literature for G. D. Philip, entitled "Technological and Practical Aspects of Manufacture of Spice Sauces", published in Lebensmittelechniek, 1985(17–5), pp. 222–224, 226.

*Primary Examiner*—Jeanette Hunter
*Attorney, Agent, or Firm*—David Edwards

[57] ABSTRACT

A no and low fat salad dressing composition includes a continuous aqueous phase containing a semi-gelled pourable system comprising an amidated galacturonic acid methyl ester with a degree of esterification below 55% (LMA pectin) to replace part or all of the fat in order to make a salad dressing that has organoleptic characteristics that imitiate real salad dressing.

40 Claims, No Drawings

NO AND LOW FAT SALAD DRESSING COMPOSITIONS

The present invention relates to no and low fat salad dressings and the processes for preparing them.

BACKGROUND OF THE INVENTION

Today's society is becoming more health and weight conscious with a large portion of the population having a growing desire to feel and look better. One of the major ways for people to become healthier is for them to get their weight under control. Reducing the amount of calories that is consumed in a day will enable a person to lose weight and thus help that person to become a more healthier and vibrant individual. A large portion of the calories that a person consumes is associated with the amount of fat that is consumed. Hence, by a person reducing the amount of fat that is consumed in a day, he will inevitably reduce the amount of calories that he consumes, and thus he will lose weight and become healthier when combined with a physical fitness program. Not only will a person feel better about himself but he will improve his health by improving his cardiovascular functions. Consequently, a whole new market for no and low-fat products has emerged.

No and low fat foods are synonymous with low calories foods that have been widely advocated as a diet regimen to control excess body weight. One such food is low calorie salad dressing.

In general, salad dressing is an emulsified semisolid food prepared from vegetable oil(s), an acidifying ingredient of vinegar or diluted vinegar optionally mixed with citrus juice such as from lemon or lime, a starchy paste, and an egg yolk containing ingredient such as liquid egg yolks, frozen egg yolks, dried egg yolks, liquid whole eggs, frozen whole eggs, dried whole eggs, or any of the above mentioned ingredients with liquid egg white or frozen egg white. Many other optional ingredients can be added to the salad dressing as long as it does not impart to the salad dressing a color simulating the color imparted by egg yolk. Salad dressing contains not less than 30% by weight of vegetable oil and not less egg containing ingredient than is equivalent in egg solids content to 4% by weight of liquid egg yolks. In the United States, this definition of salad dressing is set forth by the Food and Drug Administration, HHS, Section 169.150 of 21 CFR chapter 1 (4-94 Ed.).

Salad dressing, and salad dressing-like dressings typically contain high amounts of fat in the form of vegetable oil(s). Most recently, an increased interest has been shown in oil-free salad dressing, or what is referred to in the art as pourable dressings. In order to meet the claim of being fat-free, the products must contain less than 1.67% by weight fat or 0.5 grams of fat per tablespoon (30 grams) serving.

Notwithstanding the above, major problems are associated with the production of acceptable fat-free or low fat salad dressings, including the need to impart the creamy mouth feel associated with the high fat content of real salad dressing.

U.S. Pat. No. 4,129,663 discloses a pourable salad dressing containing a mixture of xanthan gum and pectin as stabilizers. U.S. Pat. No. 5,137,742 discloses an approach to making a no and low fat dressing compositions by using uncooked and ungelatinized rice starch with a particular particle size. European Patent Publication 441,495 discloses how an emulsion based on an aqueous phase containing gel forming agents like agar, gelatin, pectin, and/or carrageenan can replace a part of the normally present triglycerides in mayonnaise or salad dressing. The oil phase must contain an emulsifier.

Another approach of making low fat salad dressing is disclosed in European Patent Publication no. 558,113 which discloses an oil-in-water spoonable emulsion with an aqueous phase containing microgels with a mean equivalent diameter of less than 100 microns. The aqueous phase is based on a gelling agent, e.g., pectin, and during the temperature setting, chemical shearing is applied to the product in order to obtain microgels.

Yet another approach of making no or low fat salad dressing is disclosed in U.S. Pat. No. 5,324,531 which discloses a no or low oil salad dressing using nonspheroidally shaped carbohydrate gel particles having particular size dimensions. The fat substitute is prepared by making a gel and then by means of shear, breaking the gel into well defined gel particles which will simulate emulsified products like mayonnaise, salad dressing, yoghurt and spreads.

The need still exist in the food industry for an improved fat simulating substance for making no or low fat salad dressing that still has organoleptic characteristics that imitate real salad dressing. The approach of the present invention is to use amidated galacturonic acid methyl esters with a degree of esterification below 55% (hereinafter referred to as "LMA pectin") to replace part or all of the fat in order to make a salad dressing that has organoleptic characteristics that imitate real salad dressing.

SUMMARY OF THE INVENTION

The present invention is directed to a no or low fat salad dressing composition comprising a continuous aqueous phase containing a semi-gelled system comprising at least one pectin with a degree of esterification having an upper limit of 55% and a lower limit of 5% and degree of amidation having an upper limit of 50% and a lower limit of 0.05% crosslinked with a polyvalent cation and a fat phase having a fat content with a lower limit of 0 and an upper limit of 35% by weight.

DETAILED DESCRIPTION OF THE INVENTION

It has been found that the use of LMA pectin to replace all or a part of the fat in salad dressing compositions makes it possible to obtain a soft, homogeneous semi gel/pourable texture which resembles a high fat salad dressing; in this system, proteins like egg yolk, egg white, or milk proteins such as caseinate or whey protein concentrate can also be replaced with the LMA pectin.

In accordance with this invention, the no fat (i.e., 0 to 1.67% fat) or low fat (i.e., less than or equal to 35% fat) salad dressing can have a fat content of from 0 to 35% with a pH in the range of 4.8 to 3.1. Salad dressing by definition is an oil-in-water emulsion; when the oil level of the system is decreased, the viscosity also decreases. In order to counteract this loss of viscosity, stabilizers have to be used to control the water phase.

LMA pectin can be used alone or in combination with other stabilizers in order to control the water phase or texture of the salad dressing. Although it is necessary that some LMA pectin be present in order to obtain the desired texture in the practice of this invention, it can be used in combination with other hydrocolloid stabilizers as will be discussed hereinafter. The stabilizers used in this invention are hydrocolloids (i.e., natural and synthetic polysaccharides) and include gelling agents (which form gels and provide viscosity) and thickeners (which only provide viscosity). In other words, hydrocolloid means all stabilizers which have gelling and/or thickening effect.

The LMA pectin used in the present invention must be gelled/semi gelled in the system which is normally accomplished by the addition of a cation such as calcium. Calcium is preferred because there are several natural sources of calcium in salad dressing systems; for example, protein and water normally contain calcium. If needed, however, calcium can be added to the salad dressing system as a salt in order to increase the calcium level. Enough cation or calcium has to be present in the salad dressing so that the pectin can form a gelled/semi gelled pourable texture. If too little calcium is present, the cross linking will not take place and a very low viscosity is obtained. On the other hand, if too much calcium is present, the cross linking will take place at a very high temperature so that during the cooling and mixing of the gels the texture will be broken down. This means that the final texture will be too liquid for a spoonable salad dressing. If too much calcium is present, a sequestrant is recommended in order to bind some of the calcium in order to prevent this breaking down of the texture of the salad dressing. The total level of calcium or another cation in the final dressing system should be 10–1000 parts per million (ppm).

At least one cation must be present in the system which can be calcium or another cation. Example of the cations are calcium, iron, magnesium, zinc, potassium, sodium, aluminum, and manganese and mixtures thereof. Calcium, iron, magnesium, and zinc are preferred di- and tri-valent cations with calcium being the most preferred.

In accordance to this invention, the LMA pectin is a special type of pectin that has a degree of esterification (DE) upper limit of 55%, preferably 45%, and most preferably 38%. The lower limit of the degree of esterification of the LMA pectin is normally 5%, preferably 10%, more preferably 15%, and most preferably 20%. The degree of amidation (DA) of this LMA pectin has an upper limit of 50%, preferably 40%, most preferably 25%; the lower limit of the degree of amidation is normally 0.05%, preferably 10%, more preferably 13%.

LMA pectin solution is preferably heat treated in order to insure complete hydration and also optimal utilization of the pectin. The pectin can be mixed with starch if a starch slurry is required during the production. The pectin alone or together with starch can be passed through an emulsifying unit like a colloid mill, or the pectin solution can be by passed without any shear. The pectin solution can be mixed with the other main ingredients in several different ways. Currently, production of full fat salad dressing is taking place with emulsifying equipment. The primary reason for emulsification is to insure a uniform size oil droplet in the water phase. Therefore, no fat products can be produced without emulsifying equipment.

The main function of the pectin is to form a soft semigel/pourable texture in the final product. This function does not require high shear in order to obtain the desired texture. The function of the LMA pectins is to react with the cation and form a soft gel or to provide viscosity in the final product. The LMA pectin can, if desired, be mixed with other stabilizers or hydrocolloids in order to control the characteristics of the LMA pectin gel structure.

LMA pectin can be mixed with other gelling agents such as agar-agar, carrageenan, alginate, gellan gum, xanthan gum, starch (modified or native), or other pectin types like HM-pectin (HM means high methoxyl) and LMC pectin (LMC means low methoxyl conventional). Suitable thickeners with which the LMA pectin could be mixed, include starch, modified starch, locust bean gum, guar gum, gelatin, xanthan gum, propylene glycol alginate, karaya gum, microcrystalline cellulose, carboxymethylcellulose (CMC), methyl cellulose derivatives, gum arabic, gum ghatti, gum karaya, gum tragacant, furcellaran, curdian, inulin, or mixtures thereof. By using LMA pectin as the stabilizer, only small amounts of the LMA pectin are required in order to form a homogeneous semi gel pourable texture in the salad dressing. The LMA pectin is versatile in the system because it can also replace proteins in the formulation. Therefore, by using LMA pectin in the salad dressing, the stabilizer system is very efficient as well as improves texture, mouth feel, and taste. A small amount of LMA pectin is needed in a salad dressing to produce the desired results; the lower limit of the amount needed is about 0.05% and the upper limit is about 2% by weight.

In accordance with the present invention, the amount of water used in the composition is less than 95% by weight, most preferably between 15 and 40%. The amount of water present in a salad dressing composition will depend on the manufacturer of the salad dressing because different stabilizer systems can either raise or reduce the total amount of water in the system and yet obtain the desired organoleptic properties. An acidifying ingredient should also be present such as vinegar, in an amount of about 0.005–15% by weight, preferably about 2–10% by weight.

In the place of vinegar, either wholly or in part, it is possible to use other edible acids such as citric acid, adipic acid, phosphoric acid, acetic acid, ascorbic acid, fumaric acid, tartaric acid, malic acid, gluconic acid, succinic acid and the like; juices such as from lemon, lime, grapefruit, onion, and garlic can also be used. Most preferred, however, is vinegar.

The salad dressing composition of the present invention preferably is fat free. In accordance with the FDA requirements, fat free salad dressing can contain up to 1.67% fat and yet be classified as fat free. The low fat salad dressing composition of the present invention can contain up to 35% fat and yet be classified as a low fat salad dressing. The preferred upper limit of the fat phase in the present invention is 30%, more preferably 20%. The lower limit of the fat phase is 0%.

In accordance with the present invention, egg yolk containing ingredients such as liquid egg yolks, liquid whole eggs, frozen whole eggs, dried whole eggs, or any one or more of the foregoing ingredients listed above with liquid egg white or frozen egg white, can be added in an amount of up to about 5% by weight, preferably up to about 3% by weight, this referring to dry weight of the ingredients.

In accordance with the present invention, appropriate seasonings to impart the salad dressing composition distinctive flavor characteristics can be added. These ingredients are optional and are added by the manufacturer to produce the desired palate effect (taste). Salt may be included as desired in an amount of up to about 3%, preferably up to about 2%. Still further, nutritive carbohydrate sweeteners, spices or natural flavoring, provided it does not impart to the salad dressing a color simulating the color imparted by egg yolk, monosodium glutamate, crystallization inhibitors (such as oxystearin, lecithin, or polyglycerol esters of fatty acids), and sequestrants. Calcium disodium ethylenediamine-tetra acetate (EDTA) and/or disodium EDTA are examples of sequestrants or preservatives that may be used in the salad dressing compositions.

Dairy products can also be used together with LMA pectin to make an excellent salad dressing. The dairy products can be buttermilk, cultured cream and different milk proteins.

Tomato based products can also be used together with LMA-pectin such as tomato paste or sauce or tomato stock.

The edible fat or oil used in the present invention, when desired, may be corn oil, soy bean oil, cottonseed oil, sunflower oil, rape seed oil, and the like.

In the process for making the salad dressing composition of the present invention, the LMA pectin is preferably added to the water phase together with other stabilizers and/or thickeners, if desired. The water phase is optionally heat treated in order to insure a good solution of the gum system. The aqueous gum phase can now either be mixed with the oil phase and the acid and then be emulsified or the aqueous gum phase can be mixed with an oil plus acid phase which might be emulsified in advance.

In accordance with the present invention, LMA pectin as an ingredient in the fat free or low fat salad dressing composition of the invention provides unique properties in that it has both fat mimetic properties and the desired texture.

The texture of the final salad dressing can be evaluated by means of a number of different methods. The following methods were used to evaluate the salad dressing products of the Examples:

Viscosity: Measure at Brookfield (RVDVII), Hellopath, 0.3 RPM, spindle E, Program S95.

Yield stress: Measure by Bohlin CVO. Stress sweep test, 40 mm diameter parallel plates, 1 mm gap, temperature 20° C., sweep time 100 sec., 50 steps, sweep up, starting stress 0.06 Pa, end stress 300 Pa.

Yield stress is the point where the material experiences a deformation by an increase in stress. In other words, stress below the static yield stress point will not deform the material. Stress levels above the yield stress point will deform the product.

G': The Elastic Modules/Element, measured by Bohlin CVO. Stress sweep test, frequency 1 Hz, 50 steps, 1 mm gap, 40 mm diameter parallel plates, temperature 20° C., starting stress 0.1 Pa, end stress 1000 Pa, equilibrium.

The elastic modules/element is the in-phase component of oscillation stress output with a given oscillatory strain input. In other words, G' expresses the gelled/elastic texture in a given material.

These properties are achieved by using the LMA pectin in the preferred salad dressing composition as follows:

0–5% protein (e.g., gelatin whey protein concentrate, caseinste skim milk powder, and butter milk powder), 0.05–2% of LMA pectin, 0–20% of other stabilizers (e.g., xanthan, guar gum, locus bean gum, starch, modified starch, CMC or other cellulose derivatives, carrageenan, alginates, gellan gum, HM pectin, and LM pectin), 0–30% of carbohydrate (e.g., maltodextrin, corn syrup, sucrose, fructose, and lactose), 0–20% of sugar, 0–30% of dairy products (e.g., milk, buttermilk, cultures, natural cream or cultured milk), 0–30% of seasonings (e.g., salt, spices, and monosodium glutanate), 0–50% of tomato based products (e.g., tomato paste or sauce), 0.005–15% edible acid (e.g., vinegar, adipic acid, citric acid, phosphoric acid, lactic acid, acetic acid, ascorbic acid, malic acid, succinic acid, gluconic acid, tartaric acid, fumaric acid, lemon juice, lime juice, grapefruit juice, onion juice, and garlic juice, and mixture thereof), 0–35% of oil or fat, 0.001–2% of calcium or magnesium salts (e.g., calcium chloride, calcium acetate, monocalcium phosphate, calcium lactate, calcium gluconate, calcium sulfate, calcium citrate, calcium tartrate, dicalcium phosphate, tricalcium phosphate, calcium carbonate), 0–20% of flavors, and 0–20% of colors.

The following examples are provided to further illustrate the present invention. The scope of the invention is not, however, meant to be limited to the specific details of these examples. All percentages are based on weight unless otherwise stated. In each of the following Examples, the LMA pectin has a DE of approximately 38% and a DA of approximately 13%.

EXAMPLE 1

Fat Free Salad dressing

| Ingredients (wt. %) | I | II |
| --- | --- | --- |
| Starch (Ultra tex 4)* | 2 | 2 |
| Xanthan | 0.2 | 0.2 |
| Water add up to 100% | | |
| LMA-pectin | | 0.5 |
| $CaCl_2$ | 0.05 | 0.05 |
| Maltoxdextrin | 10 | 10 |
| Sugar | 4 | 4 |
| Salt | 1.2 | 1.2 |
| Sodium Benzoate | 0.1 | 0.1 |
| Vinegar | 10 | 10 |
| Viscosity (1000 cps) | 1 | 9.5 ± 1 |
| Yield Stress (Pa) | 0 | 8 |
| G' (Pa) | 3 | 105 |

*Marketed by National Starch

Procedure 1.

A dry blend of LMA-pectin, xanthan and sugar were added to the water (preferably above 40° C.) and then mixed for 2 minutes to hydrate the hydrocolloid. The starch and maltodextrin were then added to the aqueous solution. The salt, vinegar, sodium benzoate, $CaCl_2$ and possible other flavors were then mixed into the premixed water solution. The dressing was then filled into suitable packaging and evaluated.

EXAMPLE 2

Low Fat Salad dressing

| | Ingredients (wt. %) | III | IV |
| --- | --- | --- | --- |
| A | Starch (Ultra tex 4)* | 1 | 1 |
| A | Water add up to 100% | | |
| A | LMA-pectin | | 0.4 |
| A | Maltodextrin | 10 | 10 |
| A | Sugar | 4 | 4 |
| B | Salt | 1.2 | 1.2 |
| B | Sodium Benzoate | 0.1 | 0.1 |
| B | $CaCl_2$ | 0.05 | 0.05 |
| B | Vinegar | 10 | 10 |

-continued

|   | Ingredients (wt. %) | III | IV |
|---|---|---|---|
| B | Water | 5 | 5 |
| B | Oil | 5 | 5 |
| B | Xanthan | 0.2 | 0.2 |
|   | Viscosity (1000 cps) | 1.5 | 9.0 ± 1 |
|   | Yield Stress | 0 | 9 |
|   | G' (Pa) | 4 | 110 |

*Marketed by National Starch

Procedure 2

A dry blend of LMA-pectin and sugar were added to the water (preferably above 40° C.) and then mixed for 2 minutes to hydrate the hydrocolloid. The starch and maltodextrin were then added to the aqueous solution. Part B ingredients were premixed and emulsified by means of a colloid mill. Part A and Part B were then mixed and filled into suitable packaging and evaluated.

EXAMPLE 3

Low Fat Salad dressing (30% fat)

|   | Ingredients (wt. %) | V | VI |
|---|---|---|---|
| A | Starch (Ultra tex 4)* | 0.5 | 0.5 |
| A | Water add up to 100% |   |   |
| A | LMA-pectin |   | 0.4 |
| A | Maltodextrin | 5 | 5 |
| A | Sugar | 4 | 4 |
| A | Salt | 1 | 1 |
| B | Vinegar | 4 | 4 |
| B | Water | 21 | 21 |
| B | Starch (Ultra Tex 4) | 0.6 | 0.6 |
| B | Oil | 30 | 30 |
| B | Xanthan | 0.25 | 0.25 |
| B | Buttermilk | 15 | 15 |
|   | Viscosity (1000 cps) | 3.4 | 7.4 |

*Marketed by National Starch

Procedure 3

A dry blend of LMA-pectin and sugar were added to the water of Part A and mixed for 2 minutes to hydrate the hydrocolloid. The starch and maltodextrin were then added to the hydrated blend. Part B ingredients were premixed and emulsified by means of a colloid mill. Part A and Part B were then mixed and filled into suitable packaging and evaluated.

What is claimed:

1. A no and low fat salad dressing composition comprising a continuous aqueous phase containing a semi-gelled system comprising at least one pectin with a degree of esterification having an upper limit of 55% and a lower limit of 5% and degree of amidation having an upper limit of 50% and a lower limit of 0.05% crosslinked with a cation and a fat phase having a fat content with a lower limit of 0 and an upper limit of 35% by weight.

2. The composition of claim 1 wherein the upper limit of the degree of esterification is 45%.

3. The composition of claim 1 wherein the upper limit of the degree of esterification is 38%.

4. The composition of claim 1 wherein the lower limit of the degree of esterification is 10%.

5. The composition of claim 1 wherein the lower limit of the degree of esterification is 15%.

6. The composition of claim 1 wherein the lower limit of the degree of esterification is 20%.

7. The composition of claim 1 wherein the upper limit of the degree of amidation is 40%.

8. The composition of claim 1 wherein the upper limit of the degree of amidation is 25%.

9. The composition of claim 1 wherein the lower limit of the degree of amidation is 10%.

10. The composition of claim 1 wherein the lower limit of the degree of amidation is 13%.

11. The composition of claim 1 wherein the upper limit of the fat phase is 30%.

12. The composition of claim 1 wherein the upper limit of the fat phase is 20%.

13. The composition of claim 1 wherein the upper limit of the fat phase is 1.67%.

14. The composition of claim 1 wherein the lower limit of the fat phase is 0%.

15. The composition of claim 1 wherein at least one cation is present.

16. The composition of claim 1 wherein the cation is a mono-, di-, or tri-valent cation.

17. The composition of claim 16 wherein the cation is selected from the group consisting of calcium, iron, magnesium, zinc, potassium, sodium, aluminum, manganese, and mixtures thereof.

18. The composition of claim 17 wherein the cation is selected from the group consisting of calcium, iron, magnesium, and zinc.

19. The composition of claim 18 wherein the cation is calcium.

20. The composition of claim 1 wherein an edible acid is present.

21. The composition of claim 20 wherein an edible acid is selected from the group consisting of vinegar, adipic acid, citric acid, phosphoric acid, lactic acid, acetic acid, ascorbic acid, malic acid, succinic acid, gluconic acid, tartaric acid, fumaric acid, lemon juice, lime juice, grapefruit juice, onion juice, garlic juice, and mixture thereof).

22. The composition of claim 21 where the pH of the composition is 3.1 to 4.8.

23. The composition of claim 1 wherein egg yolk and/or egg white or other protein is present.

24. The composition of claim 23 wherein other protein is selected from the group consisting of gelatin, caseinate, whey, skim milk powder and buttermilk powder.

25. The composition of claim 23 wherein the egg yolk and/or egg white or other protein content is from about 0.1 to about 15% by weight of the composition.

26. The composition of claim 1 wherein appropriate seasonings and flavors are present to impart to said composition a distinctive flavor characteristics.

27. The composition of claim 26 wherein the seasonings are selected from the group consisting of at least one of sugar, salt, spice, and monosodium glutamate.

28. The composition of claim 1 wherein at least one other hydrocolloid is present.

29. The composition of claim 28 wherein the at least one other hydrocolloid is selected from the group consisting of agar, alginate, propylene glycol, alginate, high methoxyl pectin, low methoxyl conventional pectin, carrageenan, gellan gum, starch, modified starch, xanthan gum, locust bean gum, karaya gum, guar gum, microcrystalline cellulose, carboxymethyl cellulose, methyl cellulose derivatives, gum tragacanth, gum arabic, furcellaran, ghatti gum, curdlan, and inulin.

30. The composition of claim 1 wherein dairy products are present.

31. The composition of claim 1 wherein tomato based products are present.

32. The composition of claim 1 wherein appropriate colors are present.

33. The composition of claim 1 wherein a carbohydrate is present.

34. The composition of claim 33 wherein the carbohydrate is selected from maltodextrin, corn syrup, sucrose, fructose, or lactose.

35. The composition of claim 30 wherein the dairy products are selected from milk, buttermilk, cultured cream, natural cream or cultured milk.

36. The composition of claim 1 wherein at least one ingredient is present selected from the group consisting of protein, other stabilizer, seasoning, carbohydrate, dairy products, edible acid, coloring, flavoring, and oil.

37. The composition of claim 1 wherein the degree of esterification is about 38% and the degree of amidation is about 13% and the upper limit for the amount of LMA pectin present is 2%.

38. The composition of claim 37 wherein the upper limit of the amount of LMA pectin present is 1%.

39. The composition of claim 38 wherein the amount of LMA pectin present is 0.4%.

40. The composition of claim 37 wherein the lower limit of the amount of LMA pectin present is 0.05%.

* * * * *